US011991509B2

(12) United States Patent
Onishi et al.

(10) Patent No.: US 11,991,509 B2
(45) Date of Patent: May 21, 2024

(54) AUDIO PROCESSING DEVICE AND METHOD

(71) Applicant: JVCKENWOOD Corporation, Yokohama (JP)

(72) Inventors: Masatake Onishi, Yokohama (JP); Akihide Shigihara, Yokohama (JP); Toshimitsu Uchiyama, Yokohama (JP); Wataru Murata, Yokohama (JP); Kiyofumi Maruyama, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 8 days.

(21) Appl. No.: 17/751,913

(22) Filed: May 24, 2022

(65) Prior Publication Data

US 2022/0386024 A1 Dec. 1, 2022

(30) Foreign Application Priority Data

May 25, 2021 (JP) ................................ 2021-087381

(51) Int. Cl.
*H04R 3/04* (2006.01)

(52) U.S. Cl.
CPC ........... *H04R 3/04* (2013.01); *H04R 2430/01* (2013.01)

(58) Field of Classification Search
CPC .............................. H04R 3/04; H04R 2430/01
See application file for complete search history.

(56) References Cited

U.S. PATENT DOCUMENTS 3,750,044 A * 7/1973 Stanley .................. H03F 3/183 381/103
5,677,987 A * 10/1997 Seki ........................ H04R 3/02 704/226
5,789,689 A * 8/1998 Doidic .................. H03G 7/007 84/633
6,608,898 B1 * 8/2003 Moore .................. H04M 9/082 381/83
7,003,120 B1 * 2/2006 Smith .................... G10H 1/383 381/103
2003/0144847 A1 * 7/2003 Roy ....................... H04K 3/825 704/278
2005/0190930 A1 * 9/2005 Desiderio ................ H03G 5/04 381/103
2007/0133823 A1 * 6/2007 Nakano .................... H04S 7/00 381/103

(Continued)

FOREIGN PATENT DOCUMENTS

JP H03263999 A 11/1991
JP 2018136472 A 8/2018

OTHER PUBLICATIONS

Mark Hammer, "The Technology of Auto-Wahs / Envelope-Controlled Filters", www.geofex.com, pp. 1-7, https://web.archive.org/web/20010203191100/http://www.geofex.com/article_folders/ecftech/ecftech.htm (Year: 2001).*

*Primary Examiner* — Daniel R Sellers
(74) *Attorney, Agent, or Firm* — Nath, Goldberg & Meyer; Jerald L. Meyer; Stanley N. Protigal

(57) ABSTRACT

An audio processing device includes an input terminal to input an audio signal and a peak shift filter. The peak shift filter increases sound pressure with a first center frequency in the input audio signal as a first peak, and shifts the first center frequency between a preset lowest frequency and a preset highest frequency.

5 Claims, 6 Drawing Sheets

(56) References Cited

U.S. PATENT DOCUMENTS

| | | | | |
|---|---|---|---|---|
| 2007/0253577 | A1* | 11/2007 | Yen | H03G 5/025<br>381/103 |
| 2011/0119061 | A1* | 5/2011 | Brown | G10L 21/02<br>704/E21.001 |
| 2016/0035370 | A1* | 2/2016 | Krini | G10L 21/02<br>704/209 |

* cited by examiner

AUDIO PROCESSING DEVICE AND METHOD

CROSS REFERENCE TO RELATED APPLICATION

This application is based upon and claims the benefit of priority under 35 U.S.C. § 119 from Japanese Patent Application No. 2021-087381 filed on May 25, 2021, the entire contents of which are incorporated herein by reference.

BACKGROUND

The present disclosure relates to an audio processing device, an audio processing method, and an audio processing program.

In an environment where background noise is present, it is desirable to clarify voice to be amplified in order to make it easier to hear the voice. Japanese Patent No. 6772889 discloses clarifying voice by emphasizing formants. When voice picked up by a microphone is amplified by a public address system and emitted from a loudspeaker, the microphone's picking up of the voice emitted from the loudspeaker and the loudspeaker's output of the voice picked up by the microphone and amplified are repeated, which may cause howling. Japanese Unexamined Patent Application Publication No. 3-263999 discloses an example of a technique for preventing howling.

SUMMARY

In a public address system or any other audio processing devices, it is required to clarify voice to be processed and suppress howling.

A first aspect of one or more embodiments provides an audio processing device including: an input terminal to input an audio signal; and a peak shift filter configured to increase sound pressure with a first center frequency in the audio signal as a first peak, and to shift the first center frequency between a preset lowest frequency and a preset highest frequency.

A second aspect of one or more embodiments provides an audio processing method including: increasing sound pressure with a first center frequency in an input audio signal as a first peak; and shifting the first center frequency between a preset lowest frequency and a preset highest frequency.

A third aspect of one or more embodiments provides an audio processing program stored in a non-transitory storage medium causing a computer to execute: increasing sound pressure with a first center frequency in an input audio signal as a first peak; and shifting the first center frequency between a preset lowest frequency and a preset highest frequency.

DETAILED DESCRIPTION

Hereinafter, an audio processing device, an audio processing method, and an audio processing program according to each embodiment will be described with reference to the accompanying drawings.

First Embodiment

Figure 1:
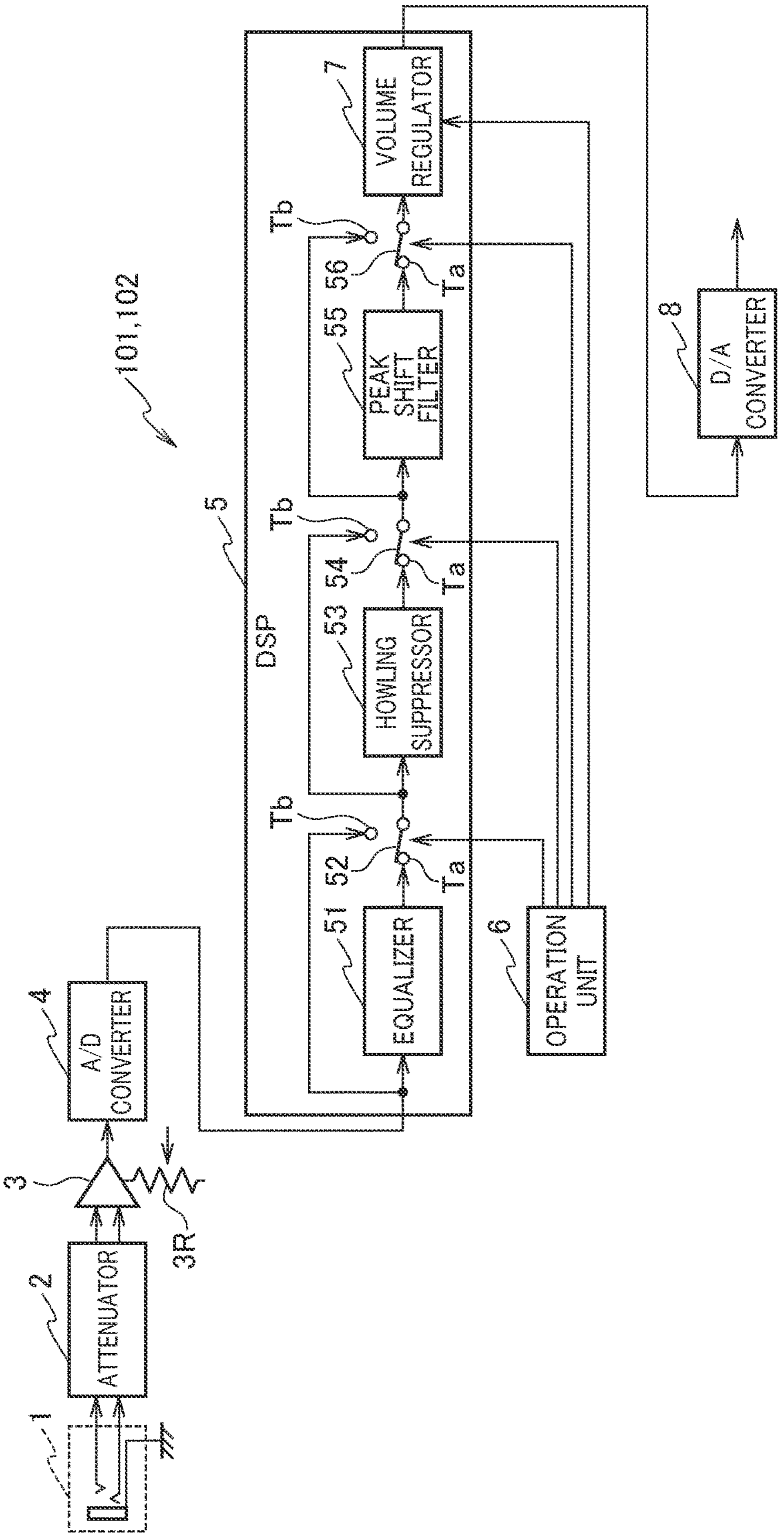
FIG. 1 is a block diagram illustrating an audio processing device according to first and second embodiments.

FIG. 1 shows an audio processing device 101 according to a first embodiment. The audio processing device 101 may be configured as a part of a public address system, or as a part of digital mixer. The audio processing device 101 executes an audio processing method according to a first embodiment.

In FIG. 1, an analog audio signal input terminal 1 is a phone jack so to speak, for example, into which an unillustrated phone plug of a microphone is inserted. An analog audio signal input from the microphone to the input terminal 1 is an example of the audio signal to be processed. In-phase and reverse-phase input signals of the analog audio signal input from the input terminal 1 are attenuated by an attenuator 2 and supplied to an operational amplifier 3. The in-phase input signal and the reverse-phase input signal are the same signal, and are balanced signals whose phases are the opposite of each other.

The operational amplifier 3 calculates the difference between the in-phase input signal and the reverse-phase input signal, and supplies the difference as an unbalanced signal to the A/D converter 4. In this way, the operational amplifier 3 supplies the analog audio signal obtained by converting the input balanced signal into an unbalanced signal to the A/D converter 4.

The A/D converter 4 converts the input analog audio signal into a digital audio signal, and supplies it to the digital signal processor (hereinafter, DSP) 5. The DSP 5 includes an equalizer 51, switches 52, 54, and 56, a howling suppressor 53, a peak shift filter 55, and a volume regulator 7.

In the audio processing device 101 shown in FIG. 1, the digital audio signal output from the A/D converter 4 is a time-domain signal, and the DSP 5 performs various processing described later on the time-domain signal. The DSP 5, to which the digital audio signal is input, may convert the digital audio signal to a frequency-domain signal by performing a discrete Fourier transform (DFT) and then perform various processing described later. Typically, a fast Fourier transform (FFT) is used as the DFT. In this case, a discrete Fourier transformer is provided in front of the equalizer 51 described later in the DSP 5.

The time-domain digital audio signal or the discrete Fourier transformed frequency-domain digital audio signal is input to the equalizer 51. FIG. 1 shows an example in which the time-domain digital audio signal is input to the equalizer 51.

The equalizer 51 corrects the sound quality of the digital audio signal by increasing or decreasing sound pressure at a predetermined one or more frequencies in the input digital audio signal. The howling suppressor 53 includes a plurality of filters for suppressing howling, and filters the input digital audio signal by means of the plurality of filters so as to suppress howling. The howling suppressor 53 may reduce the sound pressure at a specific frequency at which sound pressure is increased by howling.

The equalizer 51 and the howling suppressor 53 may have existing configurations. The user can turn off the sound quality correction function performed by the equalizer 51 by operating the operation unit 6 to switch the switch 52 from the terminal Ta to the terminal Tb. The user can turn off the howling suppression function performed by the howling suppressor 53 by operating the operation unit 6 to switch the switch 54 from the terminal Ta to the terminal Tb.

Figure 2:
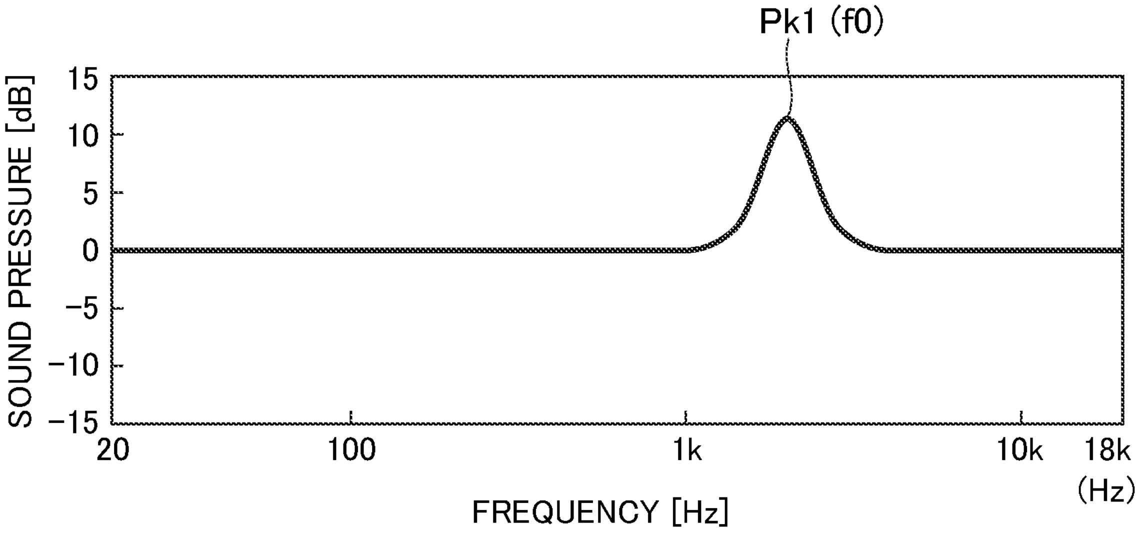
FIG. 2 is a characteristic diagram illustrating a characteristic of correcting an audio signal by means of a peak shift filter included in the audio processing device according to a first embodiment.

As shown in FIG. 2, the peak shift filter 55 newly provided in the audio processing device 101 according to a first embodiment corrects the digital audio signal so as to increase sound pressure with a predetermined center frequency f0 (a first center frequency) as a peak Pk1 (a first peak). The center frequency f0 should be a frequency suitable for clarifying the audio signal processed by the audio processing device 101.

In FIG. 2, the center frequency f0 is set to 2 kHz, which corresponds to the frequency of the consonants. The amount of increase in sound pressure at the center frequency f0 is a maximum of 15 dB, for example, and the Q value (Quality Factor) is set to an appropriate value in the range of 0.5 to 10.0, for example. It may be configured so that the user can operate the operation unit 6 to select the center frequency f0, the amount of sound pressure increase, and the Q value at which sound pressure is increased.

The peak shift filter 55 is configured to shift the center frequency f0, which determines the frequency of the peak Pk1, within a predetermined frequency range. The center frequency (here, 2 kHz) serves as a reference in the state where the center frequency f0 is not shifted, and is referred to as a reference center frequency f0*r* (see FIG. 3). The lowest frequency and the highest frequency when shifting the center frequency f0 are f0*r*/1.4 and 1.4×f0*r*, respectively, for example. That is, when the reference center frequency f0*r* is 2 kHz, the peak shift filter 55 shifts the center frequency f0 in the range of about 1.43 kHz to 2.8 kHz as an example of the frequency range between the preset lowest frequency and the preset highest frequency.

The lowest frequency and the highest frequency when shifting the center frequency f0 may be f0*r*/2 and 2×f0*r*, respectively. In this case, the peak shift filter 55 shifts the center frequency f0 in the range of 1 kHz to 4 kHz as another example of the frequency range. It may be configured so that the user can operate the control unit 6 to select the frequency range in which the center frequency f0 is to be shifted.

Figure 3:
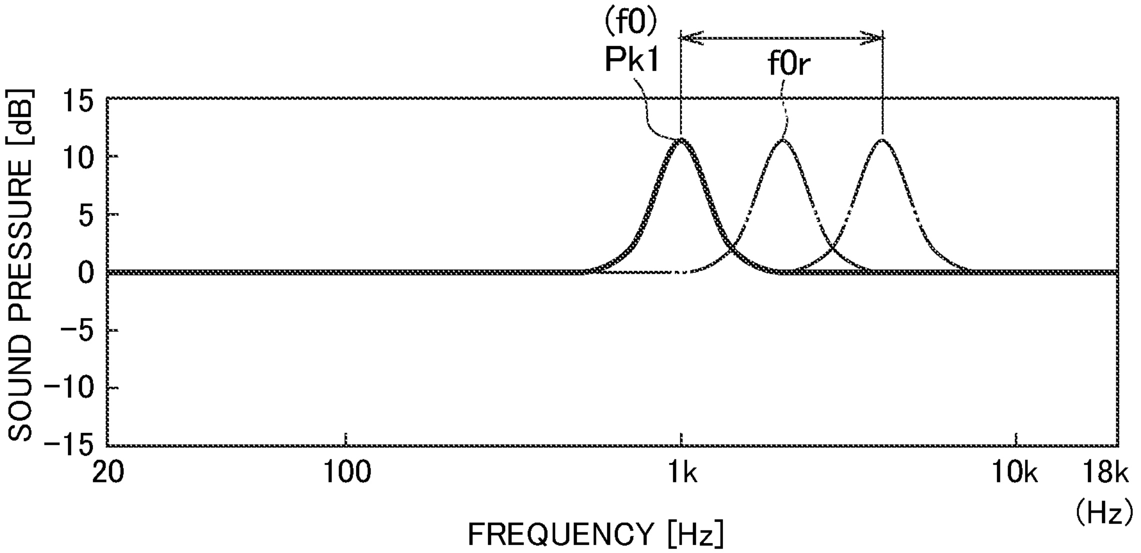
FIG. 3 is a characteristic diagram illustrating that a center frequency at which sound pressure is increased is shifted by the peak shift filter included in the audio processing device according to a first embodiment.

FIG. 3 shows a state in which the peak shift filter 55 shifts the center frequency f0 in the range of 1 kHz to 4 kHz. The peak shift filter 55 can shift the center frequency f0 as shown in FIG. 3 by varying the parameters that determine the characteristics that increase sound pressure of the digital audio signal in a mountain shape as shown in FIG. 2.

The peak shift filter 55 shifts the center frequency f0 from the lowest frequency to the highest frequency over a predetermined first time, and from the highest frequency to the lowest frequency over a predetermined second time. As the first and second times, arbitrary times such as 10 ms, 50 ms, 125 ms, 250 ms, 500 ms, or is are set, and the first time and the second time may be different. It may be configured so that the user can select the first and second times by operating the operation unit 6.

In this way, if the peak shift filter 55 shifts the center frequency f0 within a predetermined frequency range, the clarity of voice can be improved and howling can be suppressed. As described above, since howling is generated by repeating the microphone's picking up of the voice emitted from the loudspeaker and the loudspeaker's output of the voice picked up by the microphone and amplified, howling increases over time. When the center frequency f0 is shifted, howling is prevented from increasing, and as a result, howling can be suppressed.

In the audio processing device 101 shown in FIG. 1, it is possible to obtain a synergistic effect between the howling suppressing effect produced by the howling suppressor 53 and the howling suppressing effect produced by the peak shift filter 55. Note that by operating the operation unit 6 to switch the switch 56 from the terminal Ta to the terminal Tb, the user can turn off the functions performed by the peak shift filter 55 of improving the clarity of the voice and suppressing howling.

The digital audio signal output from the switch 56 is supplied to the volume regulator 7. The volume regulator 7 adjusts the volume of the input digital audio signal, and supplies it to the D/A converter 8. The user can operate the operation unit 6 to adjust the volume of the digital audio signal produced by the volume regulator 7. The D/A converter 8 converts the input digital audio signal into an analog audio signal, and supplies it to an unillustrated output terminal or a loudspeaker.

By means of the peak shift filter 55, the frequency at which sound pressure is increased is not limited to a single location, but may be increased at a plurality of locations. Specifically, the peak shift filter 55 may increase sound pressure with reference center frequencies f0*r* of around 450 Hz and 800 Hz, which correspond to the frequencies of the first and second formants of the vowel, respectively, in addition to around 2 kHz, which corresponds to the frequency of the consonant. The peak shift filter 55 shifts the center frequencies f0 within a predetermined frequency range even when the three frequencies are set to the reference center frequency f0*r*.

Second Embodiment

FIG. 1 shows an audio processing device 102 according to a second embodiment. The audio processing device 102 executes an audio processing method according to a second embodiment. The audio processing device 102 includes the same configuration as the audio processing device 101, and the configuration of the filter set in the peak shift filter 55 is different from the filter set in the peak shift filter 55 of the audio processing device 101.

The peak shift filter 55 provided in the audio processing device 102 according to a second embodiment will be described. The matters common to the peak shift filter 55 in a second embodiment and the peak shift filter 55 in a first embodiment may be omitted.

Figure 4:
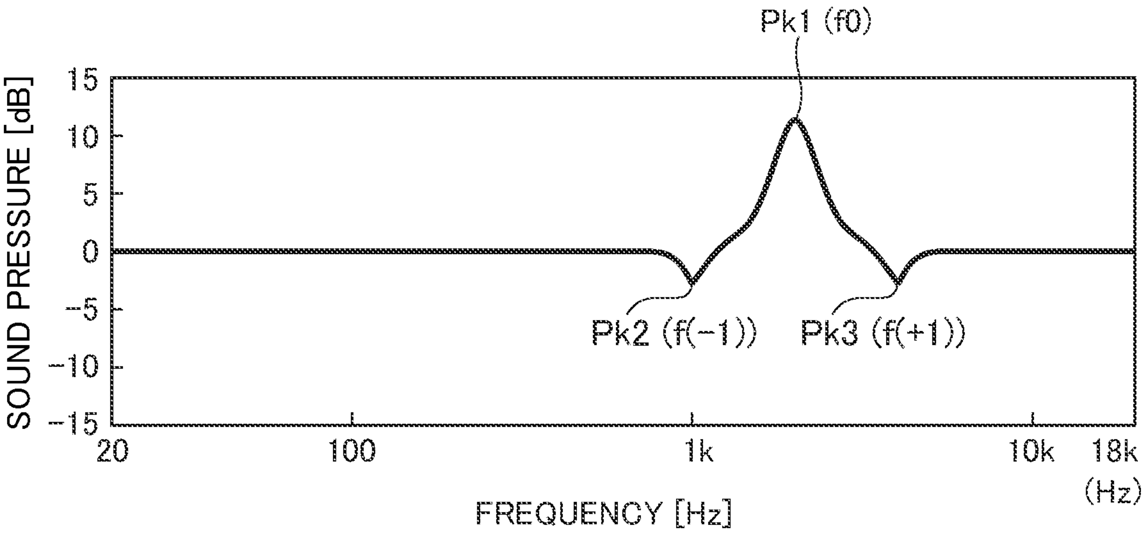
FIG. 4 is a characteristic diagram illustrating a characteristic of correcting an audio signal by means of a peak shift filter included in the audio processing device according to a second embodiment.

As shown in FIG. 4, in the audio processing device 102, the peak shift filter 55 increases sound pressure with a predetermined center frequency f0 (a first center frequency) as a positive peak Pk1 (a first peak). Further, the peak shift filter 55 decreases sound pressure with a predetermined center frequency f(−1) (a second center frequency) on the lower frequency side of the center frequency f0 as a negative peak Pk2 (a second peak), and with a predetermined center frequency f(+1) (a third center frequency) on the higher frequency side of the center frequency f0 as a negative peak Pk3 (a third peak).

In the example shown in FIG. 4, the center frequency f0, the center frequency f(−1), and the center frequency f(+1) are set at 2 kHz, 1 kHz, and 4 kHz, respectively. The amount of increase in sound pressure at the center frequency f0 is a maximum of 15 dB, for example, and the amount of decrease in sound pressure at the center frequencies f(−1) and f(+1) is a maximum of 15 dB, for example. In FIG. 4, the amount of decrease in sound pressure at the center frequencies f(−1) and f(+1) is made much smaller than the amount of increase in sound pressure at the center frequency f0. It may be configured so that the user can operate the operation unit 6 to select the center frequencies f0, f(−1), and f(+1), the amount of increase and decrease in sound pressure, and the Q value when the sound pressure is increased or decreased.

The peak shift filter 55 is configured to shift the center frequencies f0, f(−1), and f(+1), which determine the frequency of each of the peaks Pk1 to Pk3, within a predetermined frequency range while maintaining their relationship with each other. The reference center frequencies in the state where the center frequencies f0, f(−1), and f(+1) are not shifted are referred to as the reference center frequencies f0*r*, f(−1)r, and f(+1)r, respectively (see FIG. 5).

The preset lowest and highest frequencies when shifting the center frequency f0 may be the same as those in a first embodiment. The peak shift filter 55 shifts the center frequencies f(−1) and f(+1) in the same manner in conjunction with shifting the center frequency f0. The first time for shifting the center frequency f0 from the lowest frequency to the highest frequency and the second time for shifting the center frequency f0 from the highest frequency to the lowest frequency may be the same as those in a first embodiment.

Figure 5:
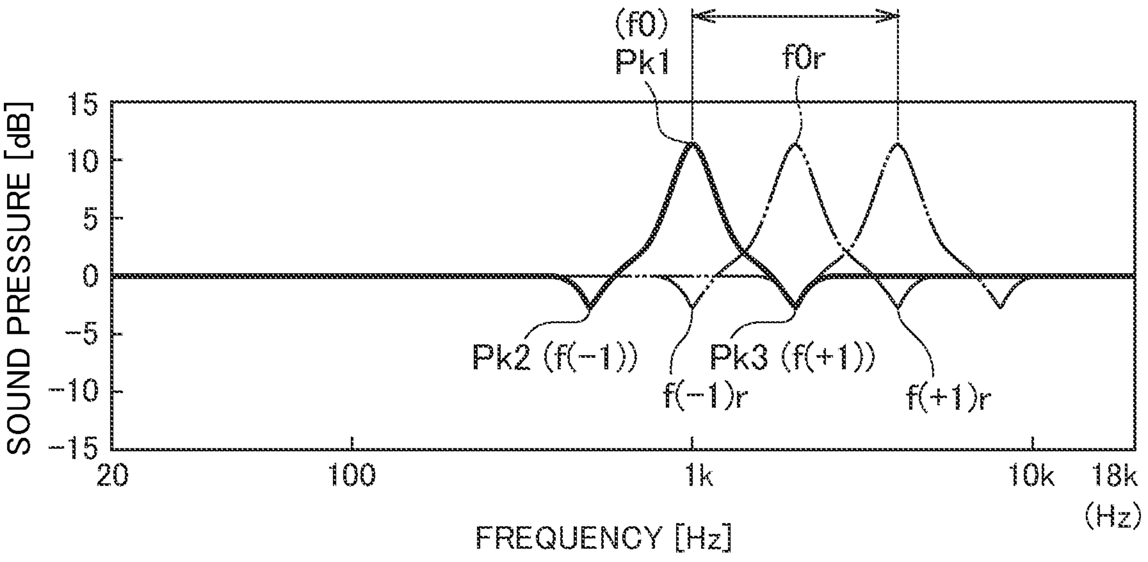
FIG. 5 is a characteristic diagram illustrating that a center frequency at which sound pressure is increased and center frequencies at which sound pressure is decreased are shifted by the peak shift filter included in the audio processing device according to a second embodiment.

FIG. 5 shows a state in which the peak shift filter 55 shifts the center frequency f0 in the range of 1 kHz to 4 kHz. The peak shift filter 55 varies the parameters that determine the characteristics that increase sound pressure of the digital audio signal in a mountain shape at the center frequency f0 and decrease sound pressure of the digital audio signal in a valley shape at the center frequencies f(−1) and f(+1) sandwiching the center frequency f0 as shown in FIG. 4. As a result, as shown in FIG. 5, the peak shift filter 55 can shift the center frequencies f0, f(−1), and f(+1) while maintaining their relationship with each other.

According to a second embodiment, howling that cannot be suppressed in a first embodiment can be suppressed. That is, a second embodiment has a better howling suppressing effect than a first embodiment. The howling that cannot be suppressed in a first embodiment is howling where the frequency at which howling occurs is different from the center frequency f0 and still occurs even if sound pressure is increased by the peak shift filter 55, or howling that occurs faster than the speed at which the peak shift filter 55 shifts the center frequency f0, for example. In a second embodiment, the peak shift filter 55 decreases sound pressure in a valley shape at the center frequencies f(−1) and f(+1) so that such howling can be suppressed.

The peak shift filter 55 should shift the center frequencies f(−1) and f(+1) so that the range of frequencies that decrease in a valley shape at the center frequencies f(−1) and f(+1) overlaps with the frequency at which howling occurs.

Also in a second embodiment, the peak shift filter 55 may increase sound pressure while shifting the three center frequencies f0 with reference center frequencies f0*r* of around 2 kHz, which corresponds to the frequency of the consonant, and around 450 Hz and 800 Hz, which correspond to the frequencies of the first and second formants of the vowel, respectively. The peak shift filter 55 decreases sound pressure in a valley shape at the center frequencies f(−1) and f(+1) so as to sandwich each center frequency f0.

Third Embodiment

Figure 6:
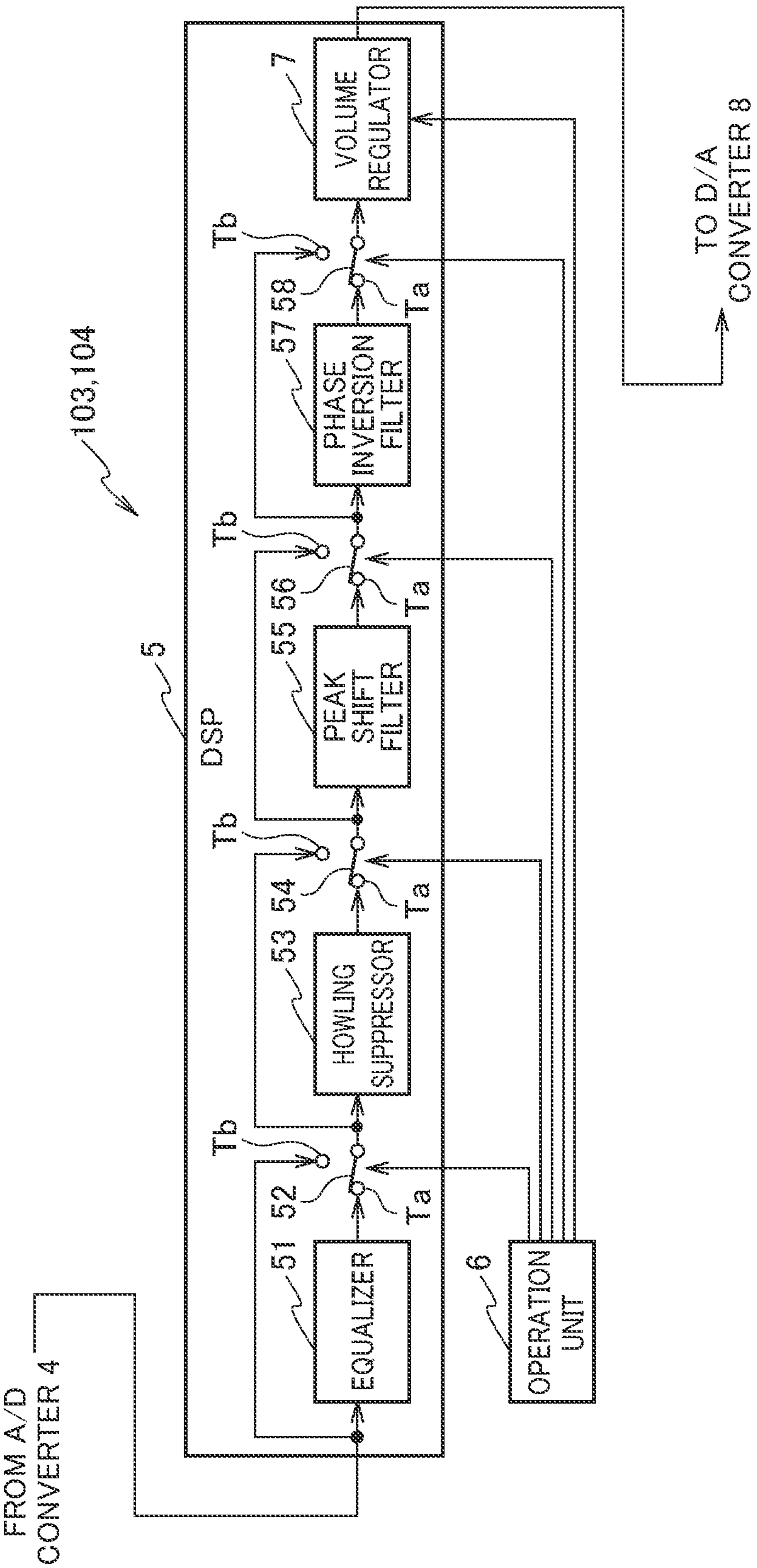
FIG. 6 is a block diagram illustrating an audio processing device according to third and fourth embodiments.

FIG. 6 shows an audio processing device 103 according to a third embodiment. The audio processing device 103 executes an audio processing method according to a third embodiment. In FIG. 6, the input terminal 1 to the A/D converter 4, and the D/A converter 8 are not shown. In the internal configuration of the DSP 5 in the audio processing device 103 shown in FIG. 6, the same parts as the internal configuration of the DSP 5 in the audio processing device 101 shown in FIG. 1 are designated by the same reference numerals, and the description thereof may be omitted.

In FIG. 6, similar to FIG. 3, the peak shift filter 55 corrects the sound pressure of the digital audio signal so as to increase it in a mountain shape while shifting the center frequency f0. The digital audio signal output from the switch 56 is supplied to a phase inversion filter 57. The phase inversion filter 57 is an all-pass filter.

Figure 7:
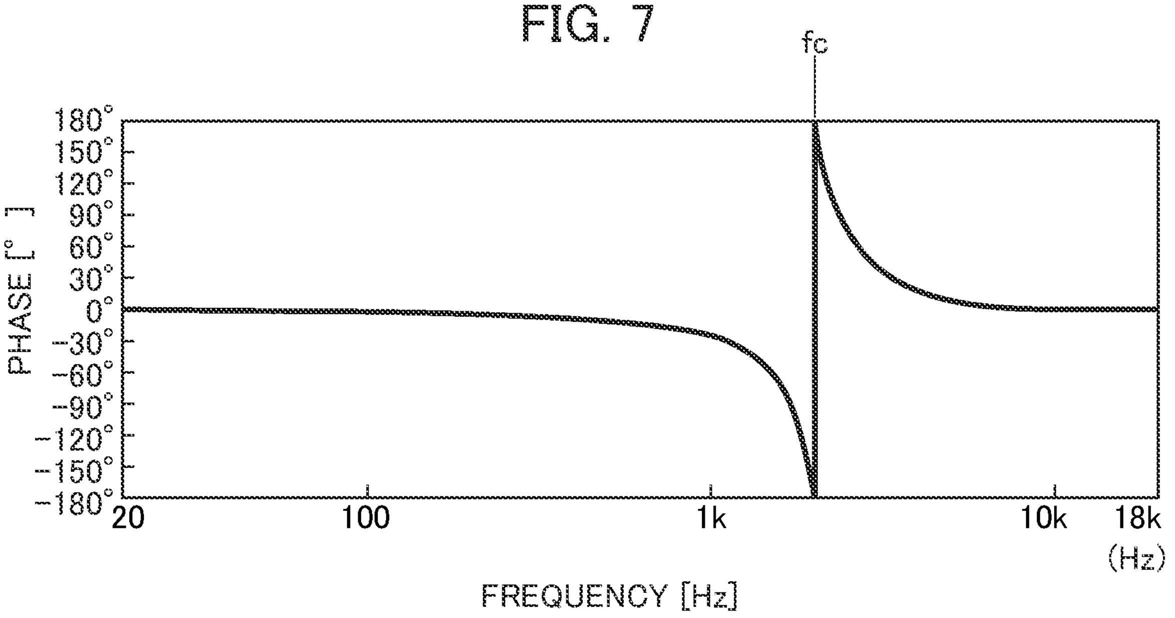
FIG. 7 is a characteristic diagram illustrating a characteristic of inverting the phase of an audio signal by means of a phase inversion filter included in the audio processing devices according to third and fourth embodiments.

As shown in FIG. 7, the phase inversion filter 57 inverts the phase of the input digital audio signal at a center frequency fc (a fourth center frequency) having a frequency of 2 kHz, for example. In addition, the phase inversion filter 57 shifts the center frequency fc in synchronization with the peak shift filter 55 shifting the center frequency f0 between the lowest and highest frequencies. It may be configured so that the user can operate the operation unit 6 to select the center frequency fc.

The center frequency fc of the phase inversion filter 57 shifts to the low frequency side if the center frequency f0 of the peak shift filter 55 shifts to the lower frequency side of the reference center frequency f0*r*, and shifts to the higher frequency side if the center frequency f0 of the peak shift filter 55 shifts to the higher frequency side of the reference center frequency f0*r*. In the example shown in FIG. 7, the center frequency fc of the phase inversion filter 57 is matched with the center frequency f0 of the peak shift filter 55. It is preferable to match the center frequency fc and the center frequency f0, but they may not be matched.

According to a third embodiment, since the peak shift filter 55 and the phase inversion filter 57 are provided, even if howling cannot be completely suppressed by the peak shift filter 55, the original voice and the voice inverted by the phase inversion filter 57 cancel out howling, and howling that cannot be suppressed in a first embodiment can be suppressed. When the center frequency fc and the center frequency f0 are matched, a higher howling suppression effect can be obtained than when they are not matched.

Note that the user can turn off the phase inversion function performed by the phase inversion filter 57 by operating the operation unit 6 to switch the switch 58 from the terminal Ta to the terminal Tb.

Fourth Embodiment

FIG. 6 shows an audio processing device 104 according to a fourth embodiment. The audio processing device 104 executes an audio processing method according to a fourth embodiment. In FIG. 6, similar to FIG. 5, the peak shift filter 55 corrects sound pressure of the digital audio signal so as to increase the sound pressure of the digital audio signal in a mountain shape at the center frequency f0 and decrease the sound pressure of the digital audio signal in a valley shape at the center frequencies f(−1) and f(+1) while shifting the center frequencies f0, f(−1), and f(+1).

As shown in FIG. 7, the phase inversion filter 57 inverts the phase of the input digital audio signal at a center frequency fc. The phase inversion filter 57 shifts the center frequency fc at which the phase is inverted in synchronization with the peak shift filter 55 shifting the center frequencies f0, f (−1), and f(+1).

According to a fourth embodiment, even if howling cannot be completely suppressed by the peak shift filter 55, since the original voice and the voice inverted by the phase inversion filter 57 cancel out howling, howling that cannot be suppressed in a second embodiment can be suppressed.

Figure 8:
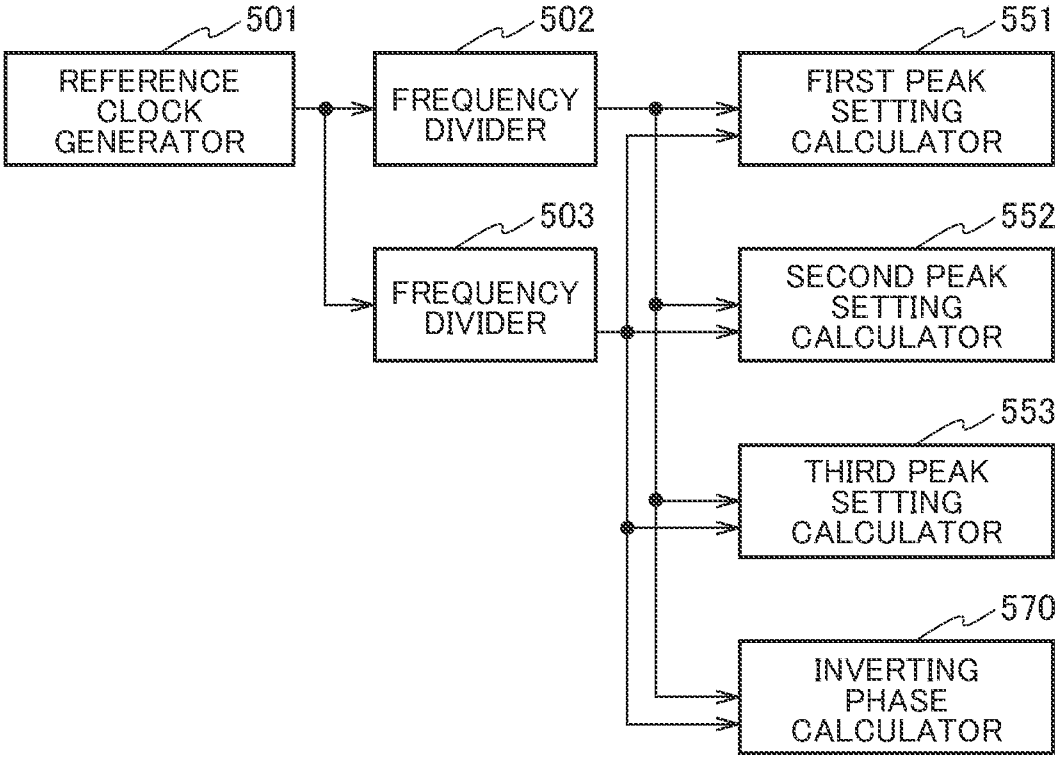
FIG. 8 is a block diagram illustrating a configuration in which the audio processing device according to a fourth embodiment synchronizes, with each other, a center frequency at which sound pressure is increased by the peak shift filter, center frequencies at which sound pressure is decreased by the peak shift filter, and a center frequency at which a phase is inverted by the phase inversion filter.

FIG. 8 shows a configuration example for synchronizing the center frequencies f0, f(−1), and f(+1) in the peak shift filter 55 and the center frequency fc in the phase inversion filter 57 in third and fourth embodiments.

In FIG. 8, a reference clock generator 501 generates a reference clock and supplies it to frequency dividers 502 and 503. The divider 502 divides the reference clock so as to generate a first clock for determining a first time required to shift the center frequency f0 from the lowest frequency to the highest frequency. The frequency divider 503 divides the reference clock so as to generate a second clock for determining a second time required to shift the center frequency f0 from the highest frequency to the lowest frequency. The reference clock generator 501 and the frequency dividers 502 and 503 may be provided inside the DSP 5 or may be provided outside.

A first peak setting calculator 551 is a calculator for setting the center frequency f0 of the peak Pk1 in the peak shift filter 55. A second peak setting calculator 552 is a calculator for setting the center frequency f(−1) of the peak Pk2 in the peak shift filter 55. A third peak setting calculator 553 is a calculator for setting the center frequency f(+1) of the peak Pk3 in the peak shift filter 55. An inverting phase calculator 570 is a calculator for setting the center frequency fc for inverting the phase of the digital audio signal in the phase inverting filter 57.

The first and second clocks generated by the frequency dividers 502 and 503 are commonly supplied to the first peak setting calculator 551, the second peak setting calculator 552, the third peak setting calculator 553, and the inverting phase calculator 570. Therefore, the first peak setting calculator 551, the second peak setting calculator 552, the third peak setting calculator 553, and the inverting phase calculator 570 always operate in synchronization with each other, since they are operated according to the common first and second clocks.

As described above, howling does not occur immediately when an analog audio signal is input, but increases over time. Therefore, it may be better to delay the phase inversion performed by the phase inversion filter 57 by a predetermined time and activate the function of suppressing howling by the phase inversion filter 57 after the howling has increased to some extent.

Figure 9:
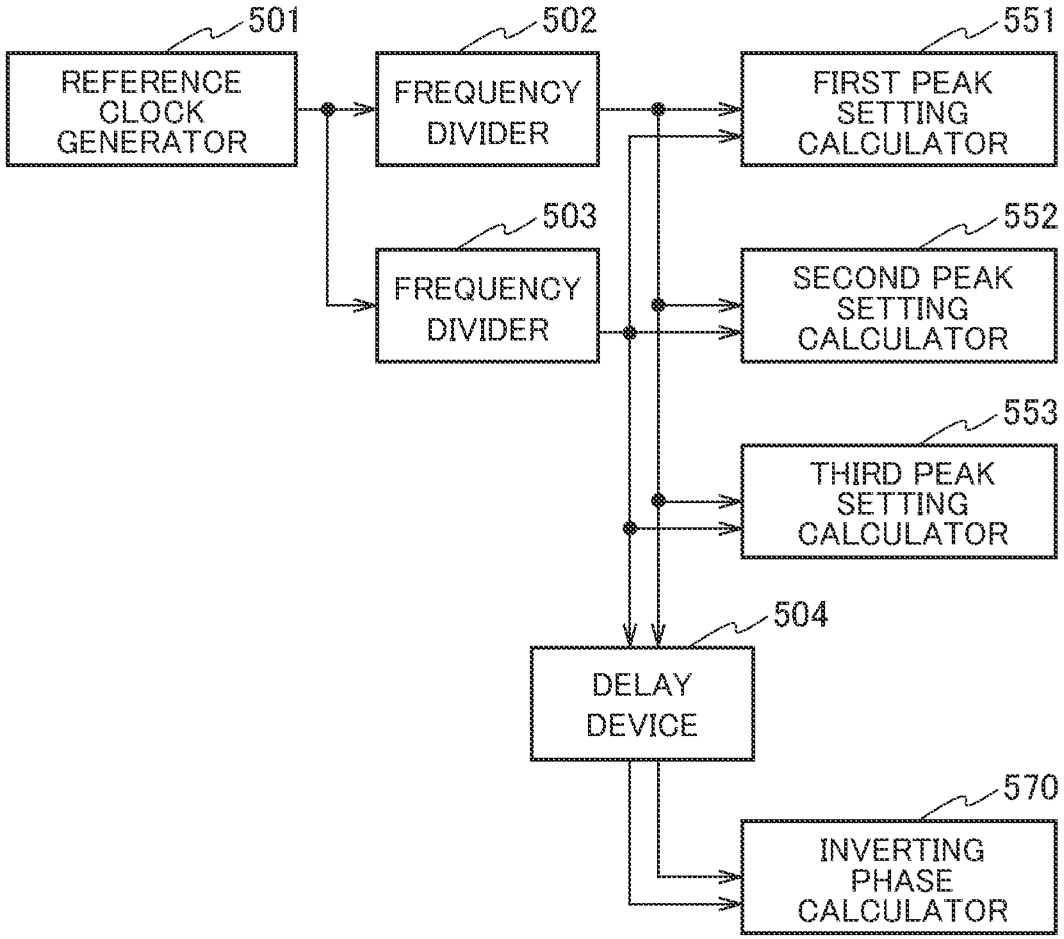
FIG. 9 is a block diagram illustrating another configuration in which the audio processing device according to a fourth embodiment synchronizes, with each other, a center frequency at which sound pressure is increased by the peak shift filter, center frequencies at which sound pressure is decreased by the peak shift filter, and a center frequency at which a phase is inverted by the phase inversion filter.

Therefore, as shown in FIG. 9, the first and second clocks output from the frequency dividers 502 and 503 may be delayed by a predetermined time by a delay device 504 and supplied to the inverting phase calculator 570.

Audio Processing Program

The configuration corresponding to the units from the equalizer 51 to the volume regulator 7 included in the DSP 5 shown in FIG. 1, or the configuration corresponding to the units from the equalizer 51 to the volume regulator 7 included in the DSP 5 shown in FIG. 6 can be configured as processes executed by an audio processing program that is a computer program. The audio processing program is stored in a non-transitory storage medium that can be read by a computer.

The audio processing program according to a first embodiment causes a computer (including DSP 5) to execute a process of increasing sound pressure with the center frequency f0 of the input digital audio signal as the peak Pk1. In addition, the audio processing program according to a first embodiment causes the computer to execute a process of shifting the center frequency f0 between the preset lowest frequency and the preset highest frequency.

The audio processing program according to a second embodiment causes a computer to execute a process of decreasing sound pressure with the center frequency f(−1) on the lower frequency side of the center frequency f0 as the peak Pk2, and with the center frequency f(+1) on the higher frequency side of the center frequency f0 as the peak Pk3. In addition, the audio processing program according to a second embodiment causes the computer to execute a process of shifting the center frequencies f0, f(−1), and f(+1) while maintaining their relationship with each other.

The audio processing program according to a third embodiment causes a computer to execute a process of inverting the phase of the digital audio signal at the center frequency fc in the digital audio signal, and shifting the center frequency fc in synchronization with the shift of the center frequency f0. The audio processing program according to a third embodiment causes the computer to execute a process of shifting the center frequencies f0, f(−1), and f(+1) while maintaining their relationship with each other, and a process of inverting the phase of the digital audio signal at the center frequency fc in the digital audio signal, and shifting the center frequency fc in synchronization with the shift of the center frequency f0.

Incidentally, an audio signal that does not cause howling, such as a synthetic audio signal, may be input to the DSP 5 of FIG. 1 or 6 instead of the audio signal picked up by the microphone. In this case, the user may turn the functions of the howling suppressor 53, the peak shift filter 55, and the phase inversion filter 57 off by operating the operation unit 6 to switch the switches 54, 56, and 58 from the terminal Ta to the terminal Tb.

The present invention is not limited to first to fourth embodiments described above, and various modifications can be made without departing from the scope of the present invention. In first to fourth embodiments, a digital audio signal is processed by the DSP 5, but howling can be suppressed by processing an analog audio signal using an audio signal processing circuit other than the DSP, for example.

The present disclosure includes matters that contribute to the realization of the SDGs' "Sustainable Cities and Communities" and contribute to the safety and security of public facilities.

What is claimed is:

1. An audio processing device comprising:

an input terminal to input an audio signal; and a peak shift filter configured to increase sound pressure with a first center frequency in the audio signal as a first peak, and to shift the first center frequency between a preset lowest frequency on a lower frequency side of the first center frequency and a preset highest frequency on a higher frequency side of the first center frequency in such a way that the first center frequency is shifted from the preset lowest frequency to the preset highest frequency over a predetermined first time and is shifted from the preset highest frequency to the preset lowest frequency over a predetermined second time that is equal to or different from the predetermined first time, wherein the peak shift filter is configured to:

decrease sound pressure with a second center frequency on a lower frequency side of the first center frequency as a second peak, and with a third center frequency on a higher frequency side of the first center frequency as a third peak; and shift the first to third center frequencies while maintaining their relationship with each other.

2. The audio processing device according to claim 1, further comprising a phase inversion filter configured to invert a phase of the audio signal at a fourth center frequency in the audio signal, and to shift the fourth center frequency in synchronization with a shift of the first center frequency.

3. An audio processing device comprising:

an input terminal to input an audio signal;

a peak shift filter configured to increase sound pressure with a first center frequency in the audio signal as a first peak, and to shift the first center frequency between a preset lowest frequency on a lower frequency side of the first center frequency and a preset highest frequency on a higher frequency side of the first center frequency in such a way that the first center frequency is sifted from the preset lowest frequency to the preset highest frequency over a predetermined first time and is sifted from the preset highest frequency to the preset lowest frequency over a predetermined second time that is equal to or different from the predetermined first time; and a phase inversion filter configured to invert a phase of the audio signal at a fourth center frequency in the audio signal, and to shift the fourth center frequency in synchronization with a shift of the first center frequency.

4. An audio processing method comprising:

increasing sound pressure with a first center frequency in an input audio signal as a first peak;

shifting the first center frequency between a preset lowest frequency on a lower frequency side of the first center frequency and a preset highest frequency on a higher frequency side of the first center frequency in such a way that the first center frequency is shifted from the preset lowest frequency to the preset highest frequency over a predetermined first time and is shifted from the preset highest frequency to the preset lowest frequency over a predetermined second time that is equal to or different from the predetermined first time;

decreasing sound pressure with a second center frequency on a lower frequency side of the first center frequency as a second peak, and with a third center frequency on a hitcher frequency side of the first center frequency as a third peak; and shifting the first to third center frequencies while maintaining their relationship with each other.

5. The audio processing method according to claim 4, further comprising:

inverting a phase of the audio signal at a fourth center frequency in the audio signal; and shifting the fourth center frequency in synchronization with a shift of the first center frequency.

* * * * *